United States Patent [19]

Cunningham et al.

[11] 4,294,878

[45] Oct. 13, 1981

[54] PROCESS FOR RAPID ANNEALING OF REFRACTORY FIBER BODIES AND LAMINATED BODY PRODUCED BY PROCESS

[75] Inventors: Richard N. Cunningham, Littleton, Colo.; Romain E. Loeffler, deceased, late of Littleton, Colo., by Carolyn R. Loeffler, personal representative

[73] Assignee: Johns-Manville Corporation, Denver, Colo.

[21] Appl. No.: 73,412

[22] Filed: Sep. 7, 1979

[51] Int. Cl.³ .............................................. B32B 7/02
[52] U.S. Cl. .................................. 428/212; 264/235; 264/237; 264/346; 264/348; 425/83.1; 428/284; 428/288; 428/296; 428/920
[58] Field of Search ............... 264/235, 237, 346, 348; 425/83.1, 371, 446; 428/241, 242, 284, 285, 288, 212, 379, 296, 920

[56] References Cited

U.S. PATENT DOCUMENTS

| | | | |
|---|---|---|---|
| 3,723,593 | 3/1973 | Ono | 264/346 |
| 3,887,524 | 6/1975 | Kirchner et al. | 264/346 |
| 4,151,235 | 4/1979 | May et al. | 264/346 |

*Primary Examiner*—James J. Bell
*Attorney, Agent, or Firm*—Robert M. Krone; Joseph J. Kelly

[57] ABSTRACT

A process for the rapid annealing of refractory fiber is disclosed. Air at a temperature of 750° F. (400° C.) to 1400° F. (760° C.) is passed through a refractory fiber body for a period of 5 to 200 seconds while the body is held securely in place for dimensional integrity. Apparatus for performing the process of this invention comprises an annealing unit containing opposed foraminous platens and means for passing hot air through the platens and through the fiber body retained between the platens or opposed foraminous belts and adjacent conduits and means for passing the hot annealing air through the conduits and belts and through the fiber body retained between the belts. The process and apparatus may be used to produce fiber bodies of a single material or laminated bodies of a plurality of interlocked layers, which may be of different fiber materials. The resultant products have excellent dimensional integrity, especially of the critical thickness dimension, and the process operates much more economically and thermally more efficiently than prior art tunnel oven processes.

15 Claims, 12 Drawing Figures

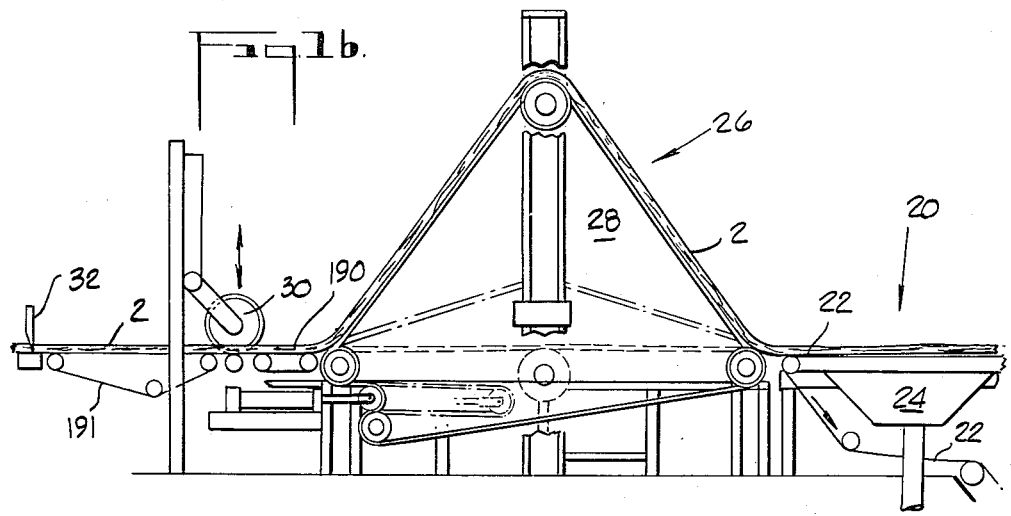
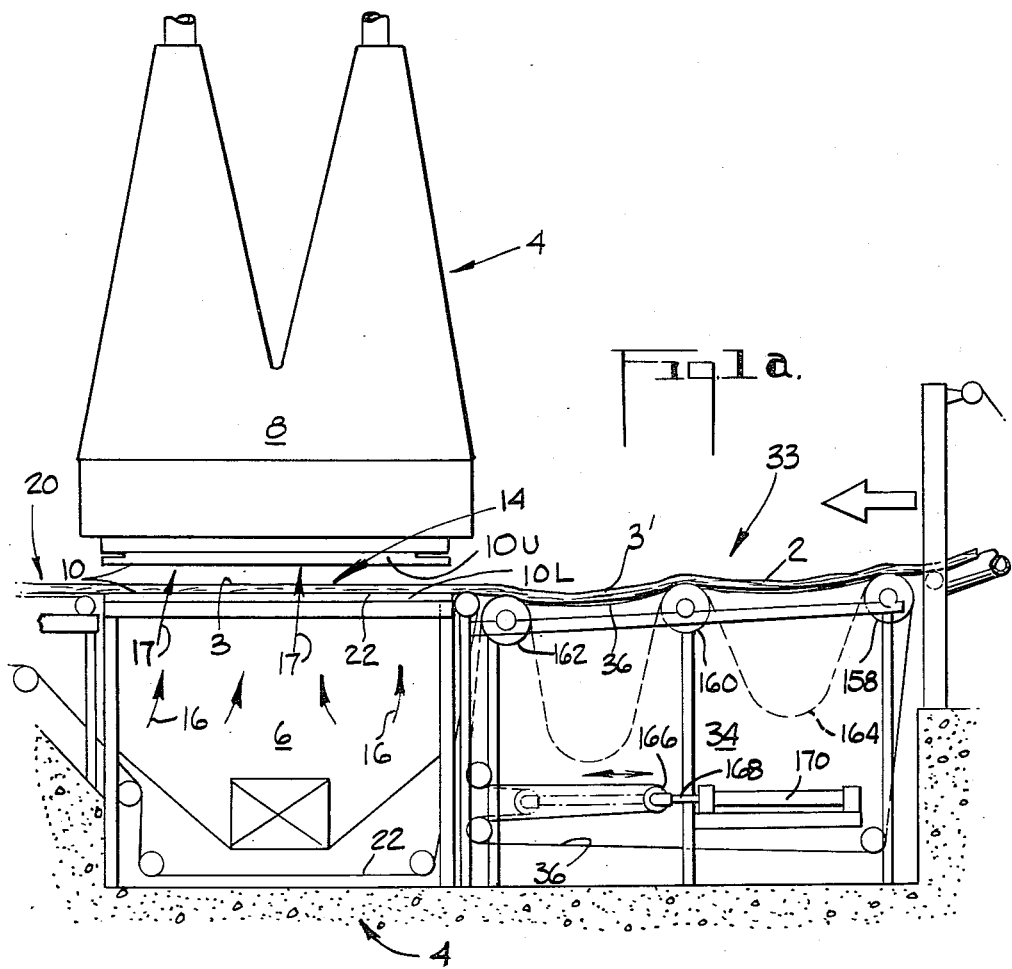

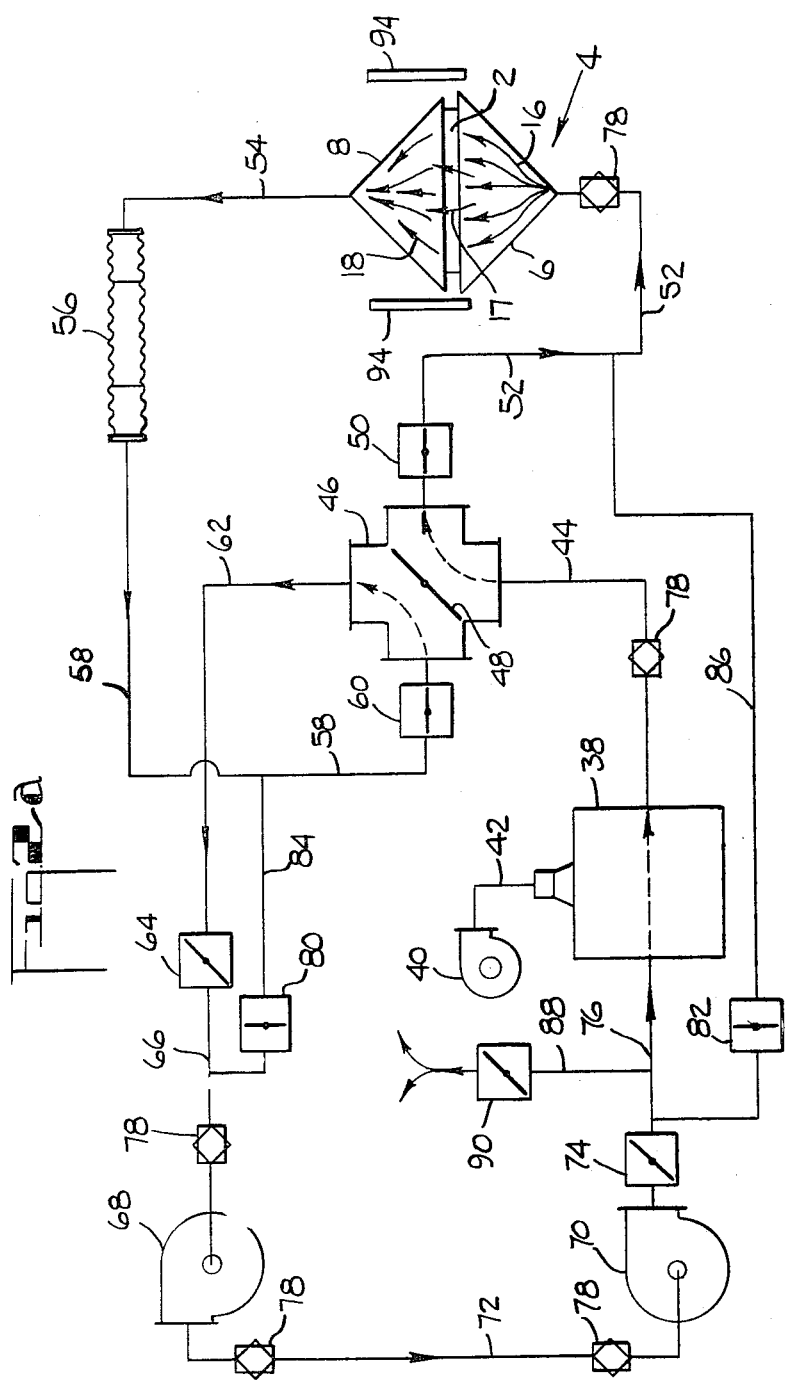

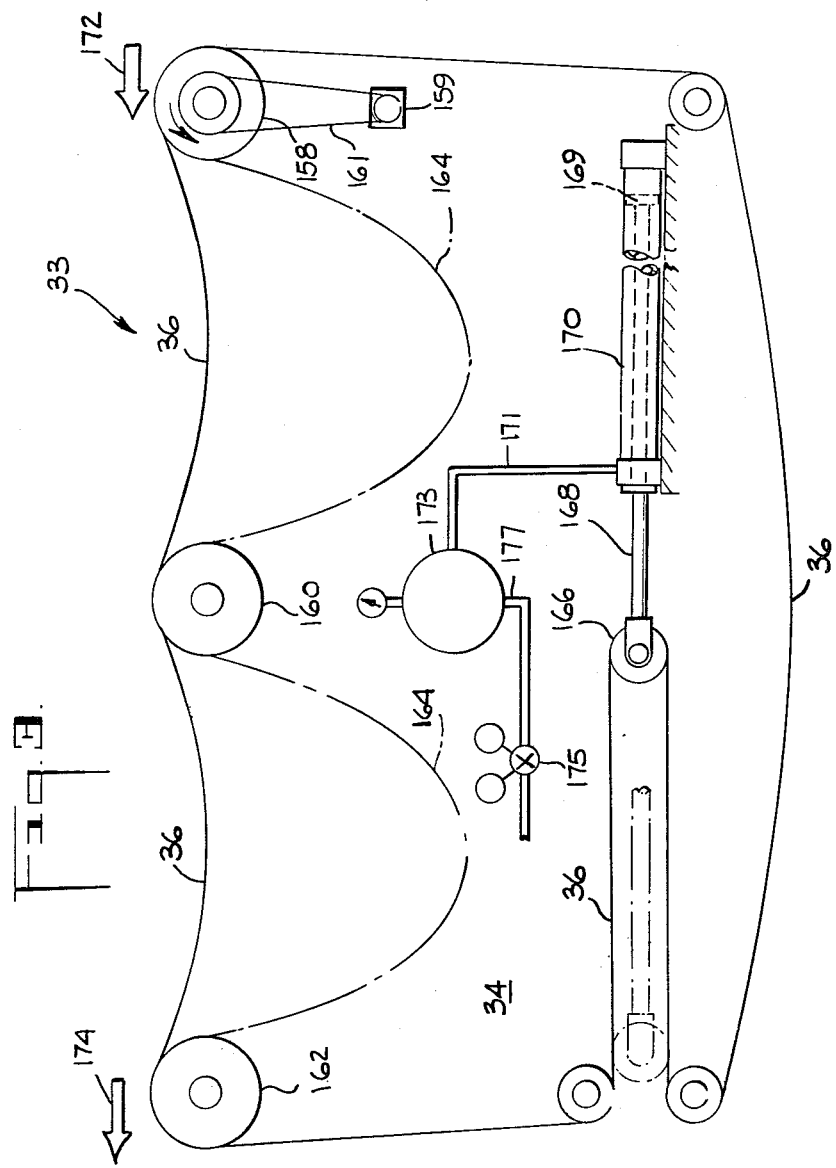

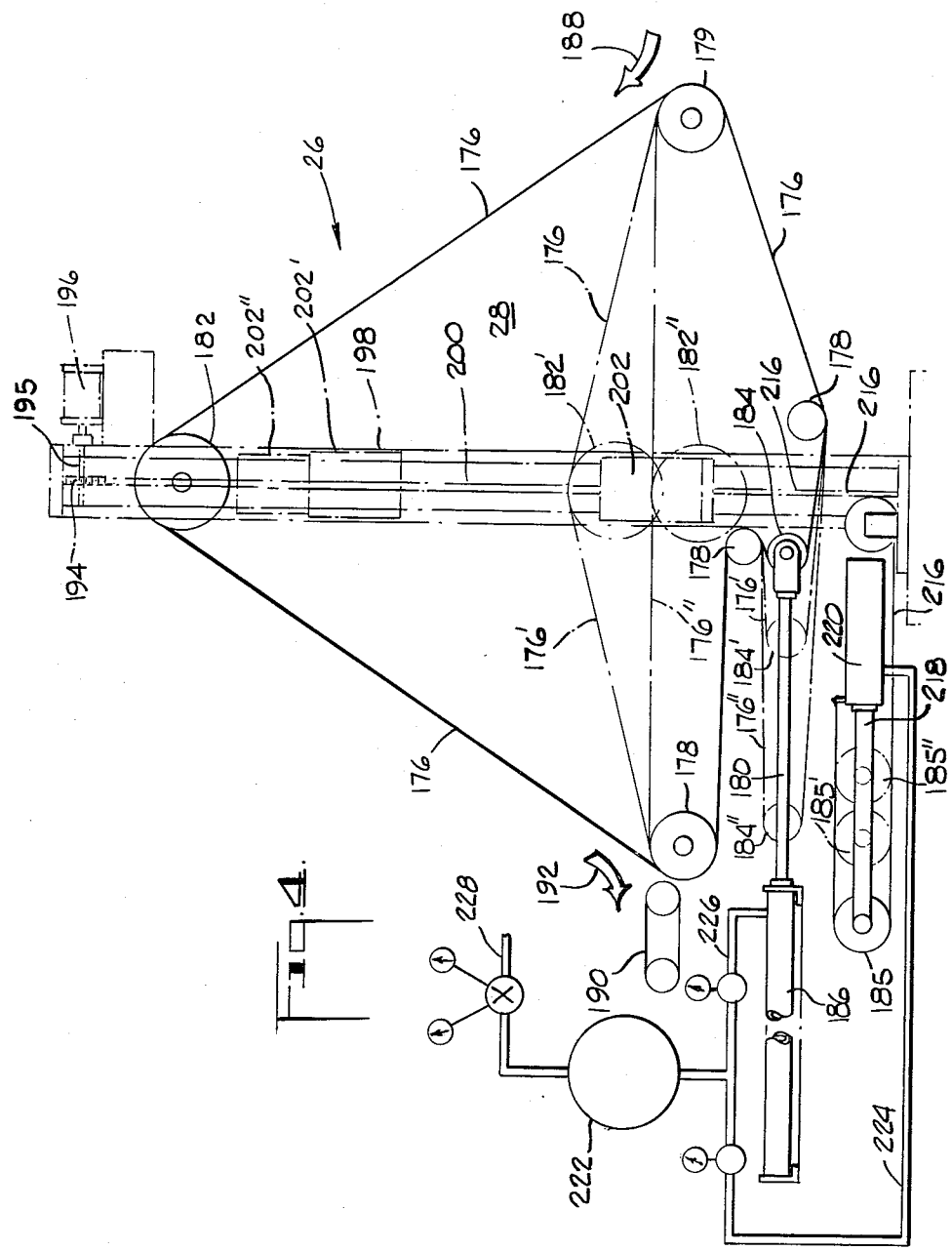

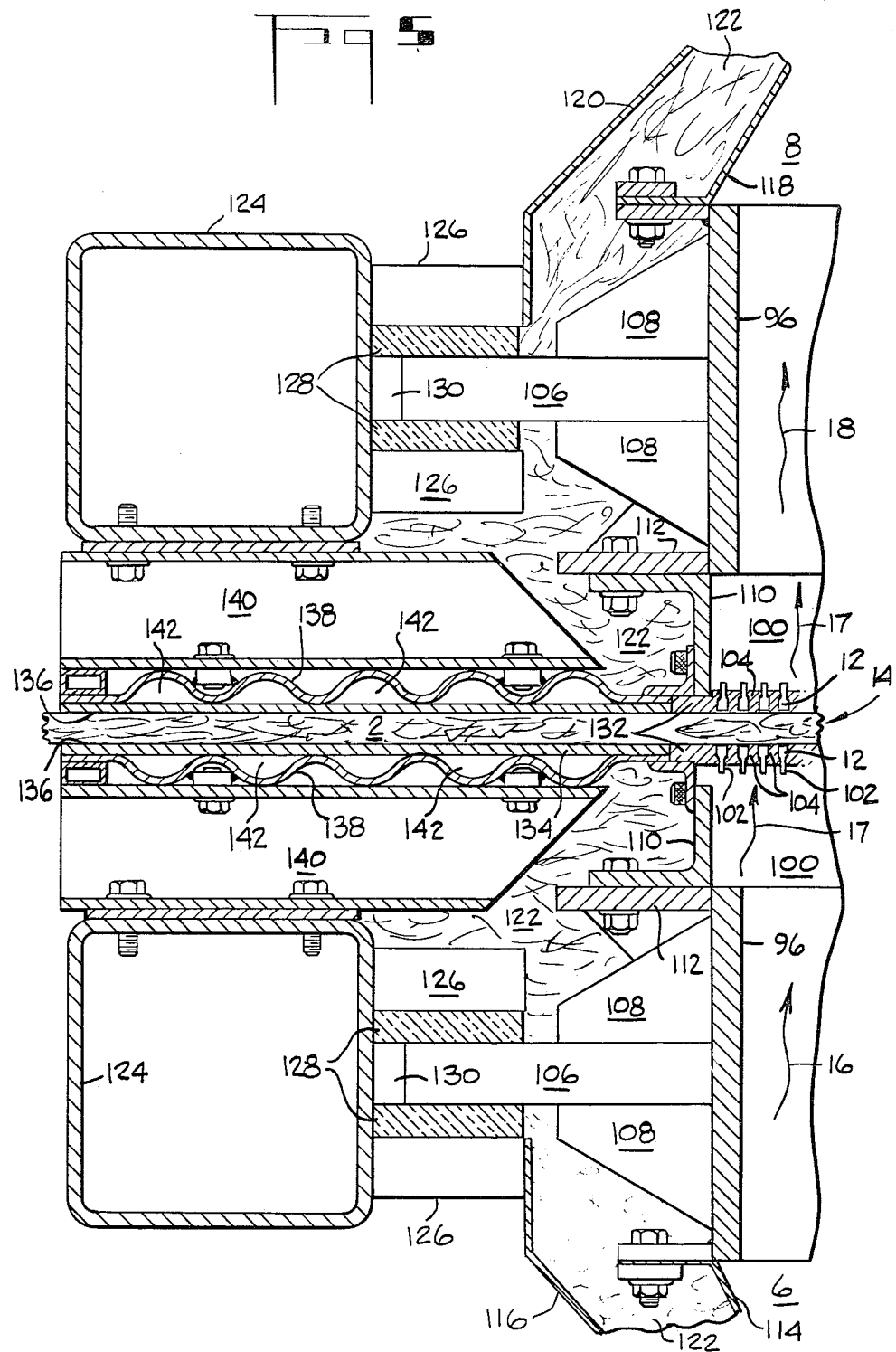

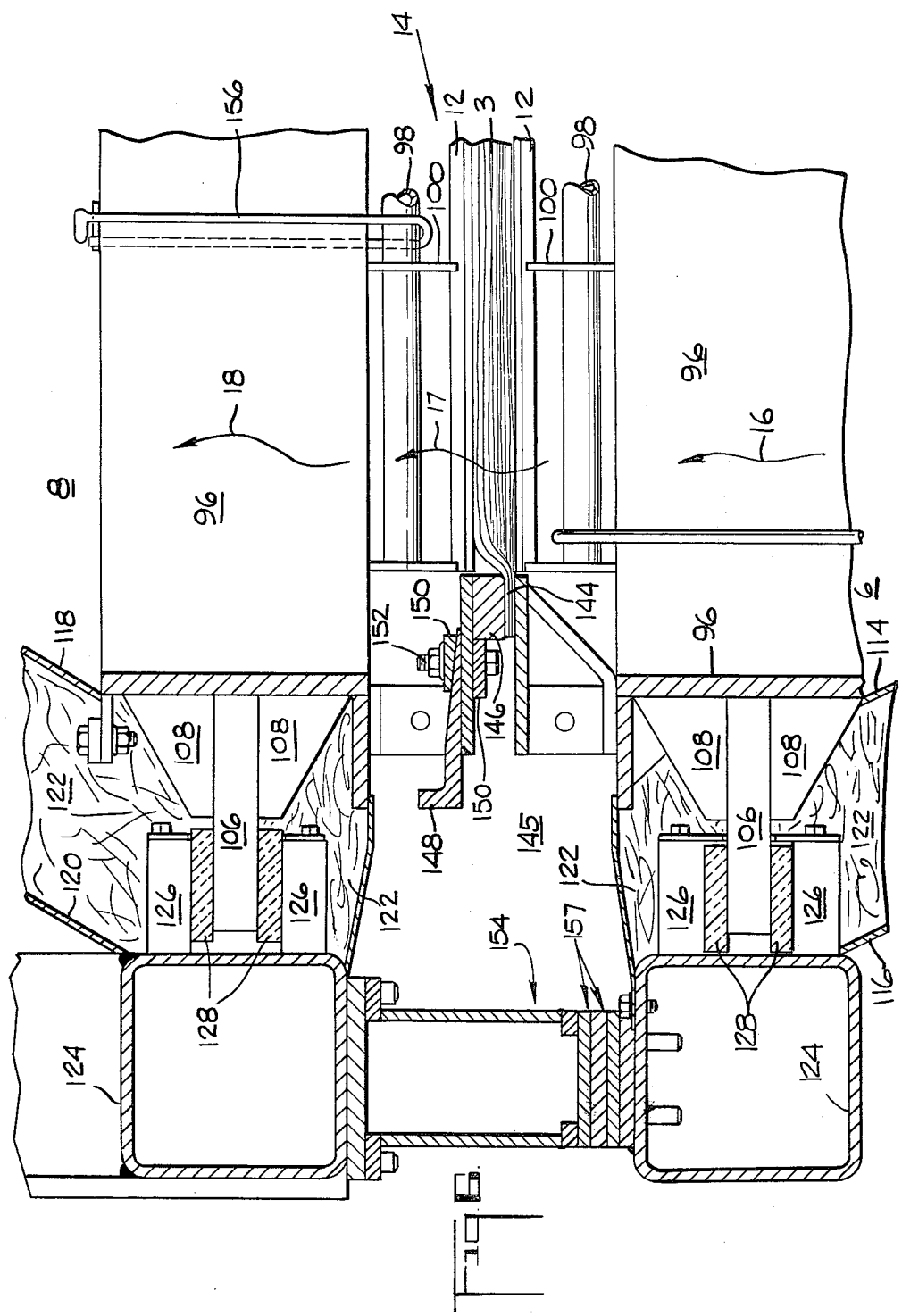

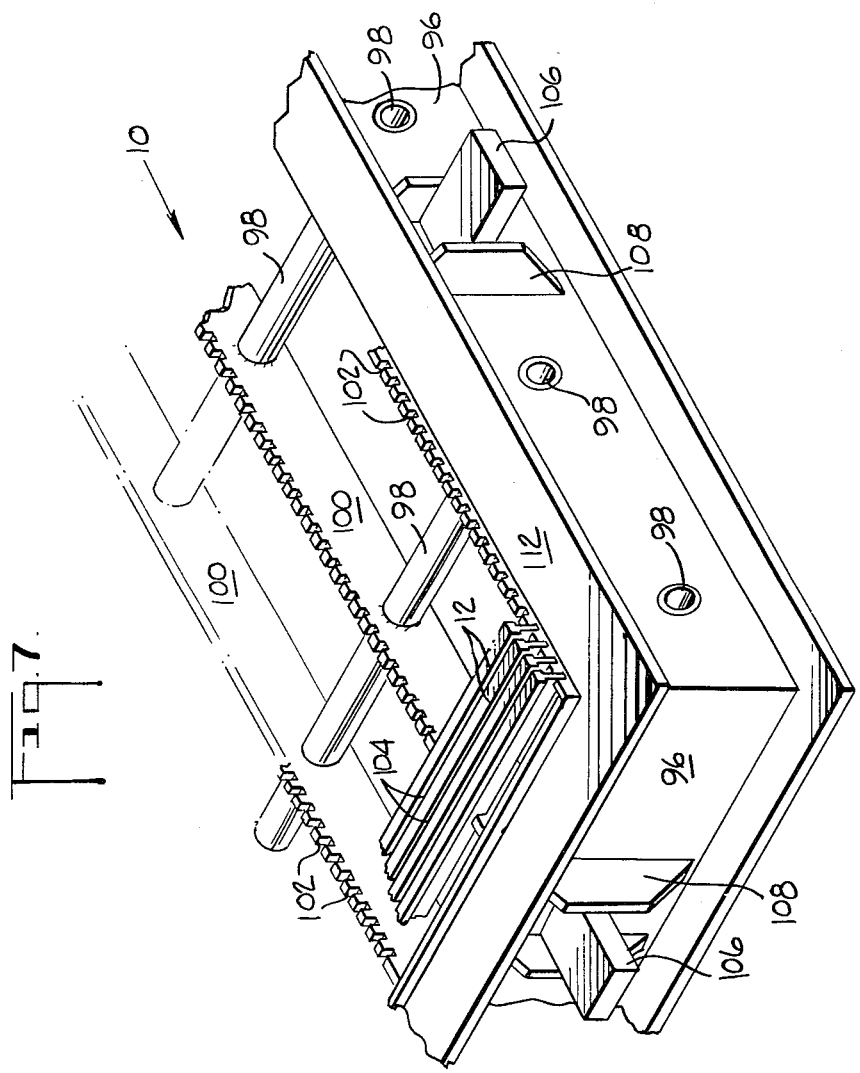

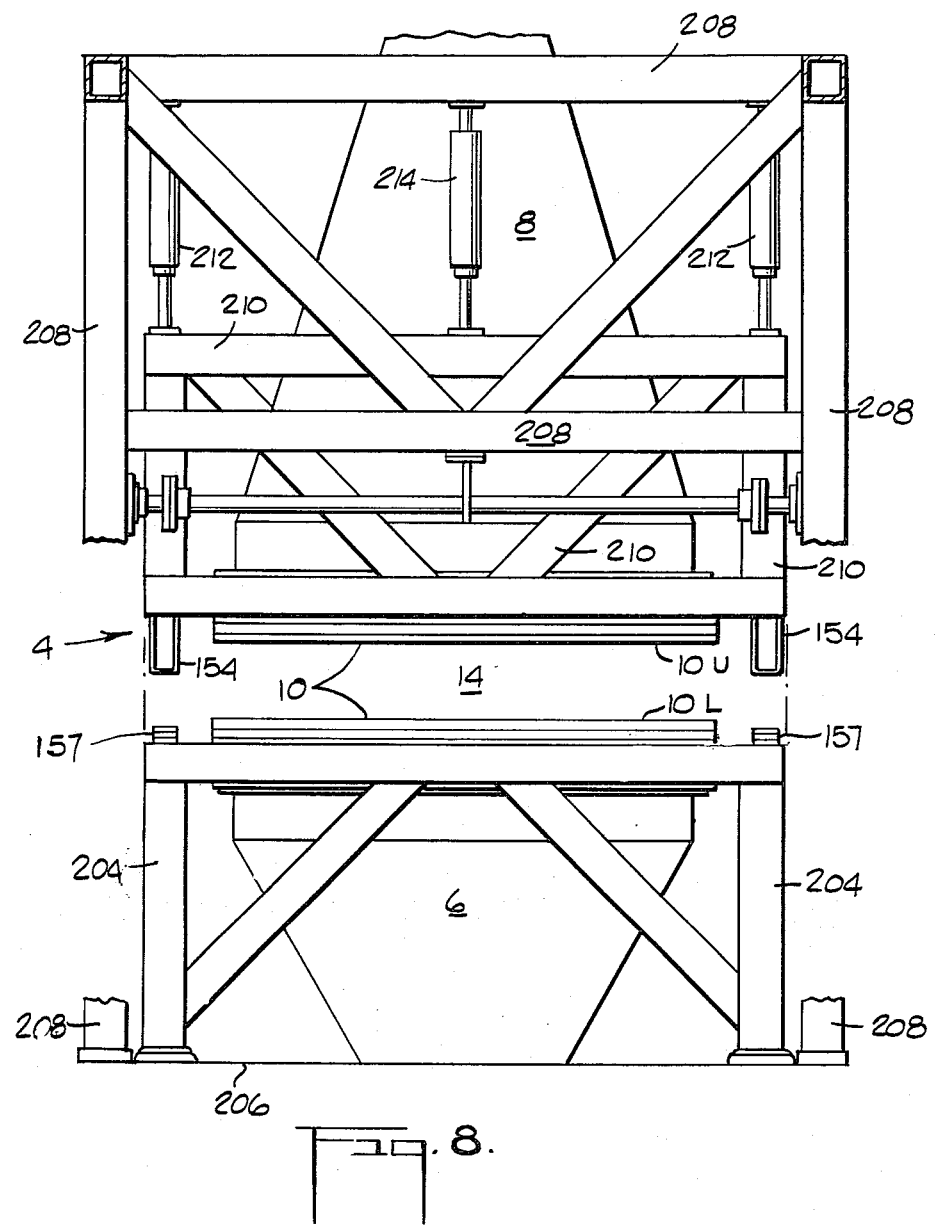

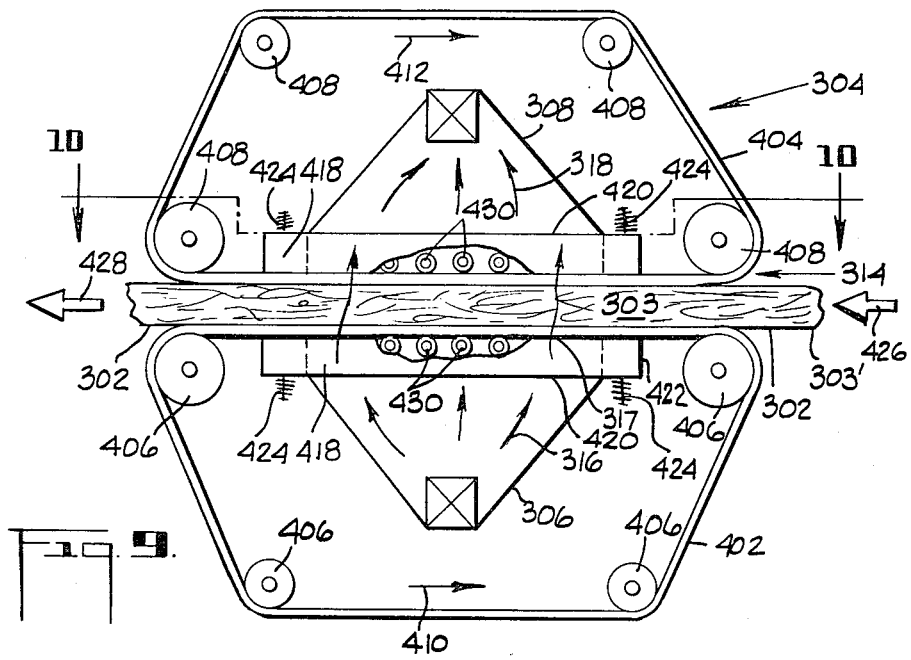
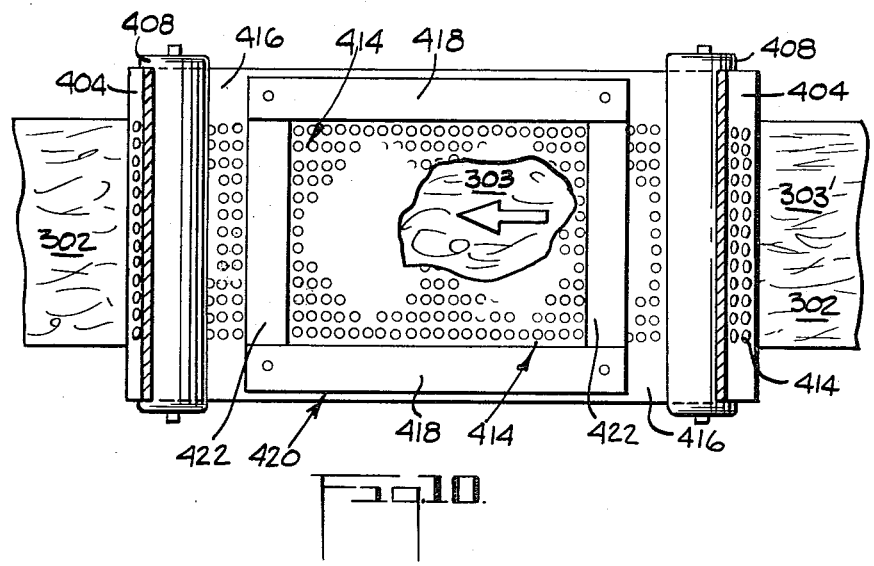

PROCESS FOR RAPID ANNEALING OF REFRACTORY FIBER BODIES AND LAMINATED BODY PRODUCED BY PROCESS

TECHNICAL FIELD

The invention herein relates to the manufacture of high temperature resistant bodies of refractory fiber. More particularly, it relates to methods of annealing such bodies.

BACKGROUND OF PRIOR ART

Refractory fibers are inorganic materials formed from melts composed of inorganic oxides, predominantly alumina and/or silica. In the conventional method of forming refractory fibers, a mixture of oxides is melted and attenuated into elongated fibers. The fibers are collected on a moving belt in the form of a low density, fluffy, continuous, blanket-like body. Thereafter the collected body of fibers can be used as a bulk fiber source, reformed into a denser mat or blanket, or broken up to form short length fibers for use in molding processes. The high temperature resistance of the refractory fiber products makes them extremely valuable for use as thermal insulation in high temperature environments such as furnaces, kilns, ovens and numerous other high temperature applications where bulk or formed insulation is required. When the original oxide mixture is formed almost entirely of generally equal amounts of silica and alumina, the resulting fibers normally are resistant to temperatures up to about 2400° F. (1315° C.). Addition of up to 10 to 20 percent by weight of other oxides in different combinations to the basic alumina/silica mixture can produce fibers of differing degrees of thermal resistance. Variation of the ratios of silica and alumina will also affect the thermal resistance, with those fibers having greater proportions of alumina being more thermally resistant than the fibers having higher proportions of silica. Commercial fibers are available for service in the range of from 1200° F. (650° C.) up to approximately 3000° F. (1650° C.). Typical of the commercial refractory fibers in the market place are those sold by Johns-Manville Corporation under the trademarks CERAWOOL, CERAFIBER and CERACHROME.

When the fibrous blanket is formed, the fibers lay down in a straight, non-interlocking configuration. Thus, the raw blanket is relatively weak and difficult to handle. Various mechanical means are used to cause strengthening by interlocking of fibers. One such means is the use of unthreaded barbed needles which force a number of fibers vertically through the blanket. However, the increase in strength which can be obtained by such mechanical means is rather limited.

Further, the use of mechanical needling does not yield blankets of good dimensional precision. Fibrous insulating blankets are normally sold on the basis of their thickness and density, which together indicate the thermal resistance properties of the blankets. Mechanical needling usually produces blankets which may have dimensional variations of 25% or more from the desired nominal thickness. Since the quantity of fibers incorporated in the blanket per unit length is controlled on the basis of nominal thickness, the variation in thickness also causes a density variation and thus a variation from the desired thermal properties. It is known that the initial attenuated fiber is formed with differential residual stress present throughout the fiber. It is also known that an elevated temperature stress relief will cause differential relief of these stresses causing the stress relieved fiber to curl. Such a heat treatment results in effective and thorough interlocking of the curled fibers throughout the blanket cross section resulting in quite effective strengthening of the blanket. The heat treated blanket is thus quite capable of being readily handled and installed in normal thermal insulation applications.

In the past it has been the practice to stress relieve the fibers by annealing the refractory fiber blankets in an oven. Typically, this is accomplished by slowly moving the refractory fiber blankets through a long heated tunnel where each is continuously exposed to a high temperature environment. Conventionally, such annealing requires a minimum of at least about 5 minutes in the oven and more commonly requires a half hour or more.

There are significant disadvantages and problems with conventional heat soak annealing. The long time periods required seriously reduce the amount of annealed fiber production which can be obtained unless extremely long heat soak tunnels are used to compensate for the long residence time. Use of long tunnels, however, raises the problem of high cost and substantial space requirements. Further, in the heat soak tunnel environment there are usually no restraints on the blankets so that the annealing process can result in dimensional distortion of the blankets within the tunnel. Since such finished annealed blankets therefore would have irregular dimensions, their subsequent installation in company with other annealed blankets in an oven or similar device is seriously complicated, for the installer must take into account the unique dimensional irregularities of such individual blankets.

In addition, the heat soak tunnels require the use of large amounts of energy. It would therefore be of significant value to have a process in which refractory fiber bodies such as blankets could be annealed rapdily while yet maintaining and assuring dimensional integrity and reducing energy consumption.

BRIEF SUMMARY OF THE INVENTION

The invention herein is a process for the annealing of a body of refractory fiber which comprises passing air at a temperature in the range of from about 750° F. (400° C.) to about 1400° F. (760° C.) through the body for a period of from about 5 to about 200 seconds while maintaining the body with a predetermined dimension in the direction of the air flow. In preferred embodiments the process includes use of temperatures in the range of from about 800° F. (425° C.) to about 1200° F. (650° C.) and intermittent feeding of refractory fiber bodies seriatim into and out of an annealing zone.

The invention also comprises apparatus for annealing a body of refractory fiber which comprises a pair of parallel opposed foraminous platens, means for moving at least one of the platens in a direction normal to the other while maintaining the platens parallel to each other, means for passing heated air through and from one platen to and through the other platen, means for intermittently inserting segments of the body seriatim into the space between the platens and retaining each of the segments in the space for a predetermined time with the opposed faces of the platens being in contact with the surfaces of the segments and spaced apart at a predetermined distance, such that the heated air passed from one platen to the other also passes through the segment located between the platens and thereby anneals the segment. In preferred embodiments the apparatus also comprises means for accepting a continuous body of fiber and feeding it intermittently into the space between the platens, means for accepting the fiber body discharged intermittently from between the platens and feeding the discharged material continuously to collection means and/or means for cooling the fiber body following discharge from the annealing zone between the platens.

In addition, the invention herein comprises annealed refractory fiber bodies formed according to the process of this invention.

BRIEF DESCRIPTION OF THE DRAWINGS

FIGS. 1a and 1b together comprise a side elevation view of an annealing production line embodying the process and apparatus of the present invention.

FIGS. 2a and 2b are schematic views illustrating the flow of heated air during the portion of a production cycle when a fiber body is being annealed (FIG. 2a) and during the remainder of the production cycle when fiber bodies are being moved into or out of the annealing zone (FIG. 2b).

FIG. 3 is a schematic side elevation view of a catenary belt accumulator useful in the present invention.

FIG. 4 is a schematic view of an inclined plane accumulator useful in the present invention.

FIG. 5 is a fragmentary elevation view partially in section of the inlet or outlet region of the annealing apparatus.

FIG. 6 is a fragmentary elevation view partially in section of the side seal apparatus of the present invention.

FIG. 7 is a fragmentary perspective view of a platen of the present invention.

FIG. 8 is an end elevation view of the annealing apparatus of the present invention.

FIG. 9 is a side elevation view, partially cut away, of an alternative apparatus for carrying out the process of this invention.

FIG. 10 is a sectional plan view, partially cut away, of the apparatus of FIG. 9 taken on line 10—10.

DETAILED DESCRIPTION OF THE INVENTION

Figure 2B:
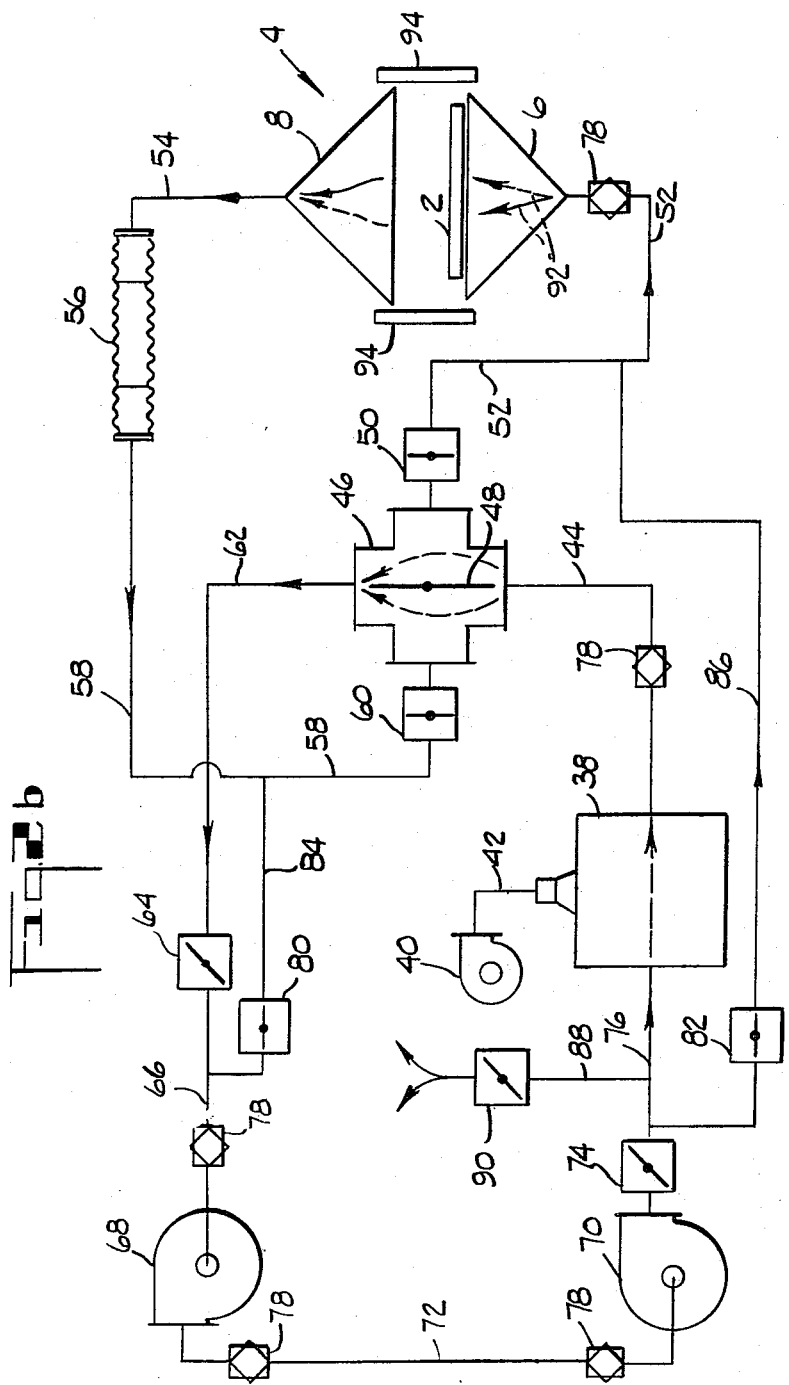

The overall operation of the process of this invention and the apparatus used therein are best illustrated in the drawings. The preferred embodiment of the apparatus is generally illustrated in the two parts 1a and 1b of FIG. 1. A fluffy, blanket-like body (hereinafter sometimes referred to as "blanket") designated 2 of refractory fibers is received from a source (not shown). This source may be the formation chamber in which the fibers are generated from the melt and collected on a moving conveyor belt. This permits formation and annealing to be part of a single continuous production operation. However, the process of the present invention is equally suitable for annealing fibers which have been previously formed and collected as in a large roll. By this means the annealing process and apparatus of the present invention can be used to anneal fibers produced by more than one furnace and formation unit and can even be used to anneal fibers which have been produced at a remote location.

The source may also include other apparatus which acts on the fiber body, such as a mechanical needler. The needler is optional, for the annealing process of this invention has been found to produce sufficiently accurate dimensioning of the blanket thickness that needling may be greatly reduced and often eliminated entirely. Some needling may be advantageous, however, as a means of incorporating holes into the blanket which can aid in distributing the annealing air through the blanket during the process of this invention and thus reduce annealing time.

Further, the "source" may actually be a plurality of sources. Thus, for instance, it is possible to form one layer of fibers on a conveyor belt and thereafter form one or more successive layers of the same or different types of fibers on top of the initial layer. The multi-layer blanket can then be rapidly and securely interlocked by the annealing process of this invention into a unitary body. It is thus quite feasible to form, for instance, a composite blanket with an expensive high temperature resistant fiber in a thin layer on the hot face side backed up with a thicker layer of less expensive lower service temperature fiber on the cold face side.

The body 2 is normally in the form of a blanket-like strip having dimensions commonly of 3 to 12 inches (7 to 30 cm) in thickness and 2 to 8 feet (60 to 250 cm) in width. (The length, of course, will be as long as desired, since the blanket will usually be unwound from rolls or fed continuously from the formation chamber). These dimensions are not critical, however, and the present invention is equally capable of annealing fiber bodies having other thickness and/or width dimensions. Further, although the process and apparatus will be described herein in terms of a continuous strip body of fiber to be annealed, since that is the most convenient form in which the fiber body 2 is supplied to the process and apparatus of this invention, it will be understood that the fiber body 2 need not be longitudinally continuous but may be cut into shorter lengths, as long as the minimum length is sufficiently longer than the length dimension of the annealing zone so that effective heat sealing at the inlet and outlet ends of the annealing zone is obtained (as will be described below). Division of the body 2 into discrete lengths prior to annealing is not preferred, however, for it complicates the problems of annealing the fiber near the cut ends. Consequently it is preferred that the feed to the process and apparatus of this invention be in the form of a substantially continuous fiber body 2, and in the remainder of this specification the description will be written with reference to such a continuous body 2. (Since the portion of the fiber body 2 which is actually being annealed in each cycle of the process is of importance in this process, it will be separately designated as portion or segment 3 in this specification. It will be understood, however, that the portion 3 is not normally physically separated from body 2.)

The fiber body 2 received from the furnace section of the line or from storage rolls passes first over inlet accumulation zone 33 which as exemplified comprises a catenary belt accumulator 34 which contains conveyor belt 36. The function of inlet accumulation zone 33 is to accept the fiber body 2 on a continuous basis and convert the continuous motion into intermittent motion to feed the material seriatim into the annealing zone 14 of annealing unit 4.

The primary device in the apparatus of this system is annealing unit 4. In the preferred embodiment shown in FIGS. 1 through 8, annealing unit 4 is composed of three major components: air inlet plenum 6, air outlet plenum 8 and platens 10 (which when dealt with separately will be designated 10U and 10L for the upper and lower platens, respectively). Each platen 10 is formed of a plurality of closely spaced and parallel but spaced apart rails 12 which support the fiber blanket portion 3 and through which the heated air can pass. In the embodiment shown in FIG. 1a the annealing unit is shown open for the non-annealing ("transport") phase of the process. During this phase the annealed portion 3 of the fiber body 2 is being moved out of the annealing zone 14 which lies between the two platens and the next un-annealed portion 3' of the fiber body 2 is being moved into position in the annealing zone 14. Once the un-annealed portion of the body 2 is in position between the two platens 10, the upper platen 10U will be lowered until it makes contact with the upper surface of the new portion 3 and until it reaches the predetermined distance from a conveyor belt such as 22 lying above the lower platen 10L, or, if no belt is used, from the lower platen 10L which corresponds to the desired thickness of the final annealed body. (In actual practice it has been found that the portion 3 should be slightly compressed beyond its nominal desired thickness—e.g., by about 10%—to compensate for the small amount of resiliency in the blanket after annealing, which causes the blanket to expand slightly after leaving the annealing zone 14.) Thereafter during the annealing phase of the process, hot air is passed through plenum 6 as indicated by arrows 16, flows through the lower platen 10L and is forced through the portion 3 of the fiber body 2 within annealing zone 14, as indicated by arrows 17, and then exhausts through the upper platen 10U and exhaust plenum 8 as indicated by arrows 18. Once the hot air annealing is completed the upper platen is raised and the annealed portion 3 of the fiber body is moved out of the annealing zone 14 and is replaced by another section of un-annealed fiber.

Movement of the blanket 2 through the annealing zone 14 is preferably accomplished by use of conveyor 22, which extends through both the annealing zone 14 and the subsequent cooling section 20. Conveyor 22 is a foraminous belt which is made of a material which can withstand the force and temperature of the hot annealing air flow. An alternative to movement by conveyor 22 is air lifting and pulling of the blanket 2, which will be discussed below.

The annealed fiber is then moved forward to cooling section 20 by conveyor 22 which carries the annealed body 2 while it cools. It is possible to allow the annealed body 2 to cool simply by being exposed to the ambient atmosphere. However, cooling can be materially enhanced by use of suction box 24 in which a reduced pressure is maintained and which therefore draws ambient air down and through the annealed body 2 as it passes over the suction box 24 in cooling zone 20 on conveyor 22.

The cooled body 2 then proceeds into outlet accumulation zone 26 which as exemplified comprises an inclined belt accumulator 28. The function of zone 26 is to accept the annealed portions 3 of the body 2 on an intermittent basis and feed the cooled material out to collection devices on a continuous basis.

The body 2 then feeds past optional slitter 30 by which it may be slit longitudinally into strips of desired width and finally passes under knife 32 which severs the strips transversely into segments of desired length. Alternatively, the body 2, whether or not slit by slitter 30, can be reeled up on a collection roll (not shown) and accumulated for further processing such as chopping of the fiber for molding material.

FIGS. 2a and 2b illustrate schematically the operation of the annealing unit 4. Hot air is generated in furnace 38 which is fed outside air by blower 40 through line 42. The blower 40 supplies primarily combustion air which in effect replaces air lost during the different phases of operation. To the greatest extent possible the heated air is recirculated and reheated as required for each cycle in order to conserve energy. It has been found that when properly operated the amount of heated air lost in each cycle is less than 10% of the total; i.e., there is greater than 90% air (and energy) conservation.

For the purposes of this specification, the term "cycle" will refer to an individual segment of the operation of the process from the time at which an un-annealed section 3' of fiber body 2 begins to enter the annealing zone 14, thus displacing the previous portion 3 for which annealing has been completed, through the actual annealing of that new portion 3 and up until the time at which the annealing unit has re-opened and the now annealed portion 3 is beginning to be conveyed out of the annealing zone 14 and the next un-annealed portion 3' is beginning to enter the annealing zone 14. A cycle consists of two "phases" which will be designated "the annealing phase" and the "transport phase". During the annealing phase the platens 10 of the annealing unit 14 are "closed", i.e., they are in their closely adjacent locked position with the portion 3 to be annealed between them and with hot air passing through the body. The remainder of the cycle is designated the transport phase during which the platens 10 are "open" and the fiber body is being moved through the annealing zone 14 to remove the now annealed portion 3 and bring in a non-annealed portion 3' for annealing during the next cycle.

During the annealing phase (FIG. 2a) the hot air from furnace 38 passes through line 44 to directing chamber 46. Within directing chamber 46 is directing baffle 48 which can be aligned as shown in FIGS. 2a and 2b to direct the flow of air to or away from the annealing unit 4. During the annealing phase the baffle 48 is aligned as shown in FIG. 2a and the hot air passing through direction chamber 46 passes on through damper 50 and line 52 to the inlet plenum 6 of annealing unit 4. The air under pressure passes through body 2 and exhausts through exhaust plenum 8 into line 54. From here it passes through flexible duct 56, line 58 and damper 60 back to direction chamber 46, from which it is directed through line 62, control damper 64 and line 66 to fan 68. Fan 68 serves to move the required volume of air and could if necessary be used to restore the pressure entirely to what is needed for the annealing phase. However, because of the high pressure drop across the dense blanket portion 3 it is preferred to use a pair of fans 68 and 70 in sequence connected by line 72 to generate the necessary air pressure. A single high speed blower could be used in place of the two fans 68 and 70. Air exiting from fan 70 passes through control damper 74 and line 76 to return to furnace 38 where it is reheated and recirculated for the balance of the annealing phase. (In both FIGS. 2a and 2b the numeral 78 indicates conventional high temperature expansion joints used in the duct work to compensate for expansion and contraction of the ducts due to temperature fluctuations.) Line 88 serves as an exhaust line and is controlled by control damper 90 to exhaust air as required.

At the termination of the annealing phase the hot air stream must be diverted from the annealing unit 4 so that the annealing unit 4 can be opened and the annealed body 3 moved out of annealing zone 14 and an un-annealed portion 3' moved into the annealing zone 14. To accomplish this, dampers 50 and 60 are closed in the transport phase and baffle 48 in direction unit 46 is aligned as shown in FIG. 2b. The main body of the heated air is therefore circulated around the cycle defined by lines 44, 62, 66, 72, and 76. Simultaneously damper 80 (which is closed during the annealing phase) is opened and a small amount of air is drawn in through exhaust plenum 8, and lines 54, 58 and 84 to prevent escape of heated air from plenum 8 into the ambient surroundings of annealing unit 4. This confinement of the hot air to the interior of the unit 4 is aided by the presence of baffles 94 mounted closely adjacent to and on either side of plenums 6 and 8. Equipment and personnel who must be in the immediate vicinity of annealing unit 4 are therefore protected to the greatest extent possible from the effects of the heated air within the unit, including that small amount of heated air which may be used to release the annealed portion of body 2 for transport.

In the embodiment shown, the conveyor 22 moves the segment 3 out of the annealing zone 14 during the transport phase. In an alternative embodiment (not shown) conveyor 22 does not extend into annealing zone 14 but rather runs only in cooling section 20. During the transport phase a small quantity of air is bled off through damper 82 and line 86 into line 52 to pass through inlet plenum 6 as indicated by arrows 92. This small amount of air provides a small positive pressure below the annealed portion 3 of body 2 and lifts that annealed portion 3 slightly off of the lower platen 10L so that it may be transported out of annealing zone 14 by the pulling action of the portions of blanket 2 moving through cooling section 20 and outlet accumulation zone 26. It will be noted from FIG. 2a that during the annealing phase dampers 80 and 82 are both closed preventing any air flow in lines 84 and 86 respectively. This embodiment is not preferred, however, for air transport of the blanket has been found to be more likely to cause blanket tearing in the un-annealed portion, and rethreading of the blanket end through the annealing zone 14 following a tear is quite difficult because of the equipment structure and the residual heat present in the equipment.

The expansion joint 56 is a large, flexible duct which is intended to permit the upper plenum 8 to raise and lower to open and close annealing section 14 and the platens 10.

A typical platen 10 is shown in FIG. 7. In the orientation shown in FIG. 7 the particular platen 10 would be the lower platen 10L, but the design of the platen is such that the upper platen 10U is just an inverted version of the same device. The platen 10 is formed of a basic frame 96 which is normally rectangular with a typical length of 8 feet (2.4 m) and a width of 4 feet (1.2 m). The rectangular frame 96 is hollow and contains transverse support tubes 98 and longitudinal ribs 100 inter-engaged with the tubes 98. The upper edge of each rib 100 is cut into a series of adjacent notches 102 into which are set rails 12. The rails 12 are closely aligned and parallel but have spaces 104 between them for the passage of the hot air through the platen 10.

Mounted on the sides of frame 96 are support bars 106 which are attached to the frame 96 by flanges 108. As will be described in conjunction with FIG. 5, these support bars 106 hold the platens 10 in their proper relationship but allow the platens 10 to expand and contract with temperature fluctuations.

In the process of this invention the heated air is kept at a temperature in the range of from 750° F. to 1400° F. (400° to 760° C.), preferably about 800° F. to 1200° F. (425° to 650° C.), and more preferably about 900° F. to 1100° F. (480° to 590° C.). It is therefore apparent that there is a great deal of heat which must be conserved by minimizing the heat transfer to the ambient surroundings. Also, the temperature fluctuations between the closed and heated condition of the annealing phase and the open condition of the transport phase result in significant expansion and contraction of the metal parts of the annealing unit 4. It is therefore important that all the various ducts, blowers, dampers and other components in the air circulation lines be properly insulated. It is also important that the annealing unit 4 itself be adequately insulated and that provisions be made in annealing unit 4 for repeated expansion and contraction of the various metal components.

The provisions for insulation and expansion and contraction are illustrated in FIG. 5. The hot air flow through the unit 4 is indicated as before by arrows 16, 17 and 18. The frame 96 is shown in cross section. The angle irons 110 shown in cross section anchor the beams 100 to the frame 96 through flanges 112. Plenum 6 has a hollow wall composed of inner plate 114 and an outer skin 116 held in place by pins (not shown) welded to inner plate 114, while exhaust plenum 8 also has a hollow wall composed of inner plate 118 and an outer skin 120 similar attached to inner plate 118. The inner plates and outer skins of the walls of the two plenums are spaced apart and the space between them is filled by insulation 122. Insulation 122 also continues throughout the side of the unit 4 between the platens 10 and the outer support structure.

The outer support structure consists of hollow structural members 124 (shown in section) to which are attached flanges 126. Flanges 126 have attached thereto insulating bearing material 128 which in turn supports bars 106 attached to the frame 96 of platens 10. Spaces 130 are provided to allow for the expansion of the platens 10 and the resulting movement of bars 106. Similarly, spaces 132 are provided such that when the platens 10 are fully expanded the outermost of the rails 12 are closely adjacent to the edge of seals 134.

Each seal 134 is composed of a facing plate 136 backed up by a corrugated sheet 138 which is attached to channel 140 which in turn is bolted to structural member 124. The inner surfaces of the facing plates 136 are smoothly polished to facilitate the movement of fiber body 2 into and out of the annealing chamber 14. The corrugations of sheet 138 cooperate with the facing plate 136 to form channels 142 adjacent to the facing plate 136 through which cooling water may, if desired, be flowed during operation of the equipment to reduce heat loss through the metal seal. Heat loss through the fiber body is prevented by the length of the segment of material present between the seals 134, since the fiber body itself is a highly effective insulator. Air flow into the annealing zone 14 through the blanket 2 from outside the equipment shown in FIG. 5 is essentially prevented by the blanket 2 itself. The air flow path through that portion of the blanket 2 between plates 136 is so long and tortuous that essentially no air passes through this blanket portion during the short time of each annealing phase.

FIG. 6 illustrates the provision for thermal sealing of the longitudinal edges of the unit 4. The edges 144 of the portion 3 of body 2 being annealed are compressed by means of bar 146 to a high density such that air flow through each edge 144 from the exterior space 145 into the annealing zone 14 is minimized (and preferably essentially eliminated). Bar 146 is held in place by bolts 152 which are secured by the wedging action of members 148 and 150. Bar 146 can be replaced by a similar bar of different thickness for different compression by the "quick change" action of wedge clamp member 148. The compressed edge is subsequently trimmed off as by slitter 30. (Also shown in FIG. 6 are clamps 156 which attach the platen 10 to frame 96 by means of tubes 98.)

The degree of compression of the blanket is controlled by member 154. The thickness of the blanket portion 3 is sized to different thicknesses by addition or removal of one or more of the shims 157 at the bottom of member 154. Typical shims vary in thickness from 1/64 inch (0.4 mm) to 2 inches (51 mm) and are used in the appropriate combination to produce the desired blanket thickness.

The inlet accumulation zone 33 shown schematically in FIG. 3. The preferred catenary belt accumulator 34 is composed of an endless conveyor belt 36 which passes over powered inlet end roller 158, one or more idler rollers 160 and powered outlet end roller 162. It is constructed with extra length so that catenaries can be formed between each adjacent roller, as indicated at 164. This formation of the catenaries is controlled by rollers 158 and 162 and pulley roller 166 which is connected to piston rod 168 and piston 169 which operate in cylinder 170. The function of the inlet accumulation zone 33 is to receive the fiber body 2 continuously from the supply source as indicated by arrow 172 and to feed the body intermittently to the annealing zone 14 as indicated by arrow 174. At the start of the annealing phase of a cycle the conveyor belt 36 will be essentially in the position shown by the solid line in FIG. 3. Roller 162 will be stopped and locked against rotation. Roller 158 will, however, be turning down at a constant speed as by motor 159 and drive belt 161. Thus as the continuous body 2 enters the accumulator 34 piston rod 168 will slowly extend allowing roller 158 to create the catenary 164 and thus take up the entire quantity of the fiber body 2 received during the period of that annealing phase even though none of the fiber body 2 is being discharged past roller 162. The motion of roller 158 as it feeds belt 36 into the catenaries 164 also causes roller 166 to extend piston rod 168. Piston 169 thus moves within cylinder 170, causing the air trapped in cylinder 170 to flow through pipe 171 to air tank 173, where the air pressure increases to a predetermined level. Make-up air as needed is provided through valve 175 and line 177. Accumulation can be aided by powering idler roller 160 during accumulation and then unclutching it during the transport phase. When the annealing phase is completed and the transport phase begins powered roller 162 is started. The air pressure in tank 173 acting against piston 169 causes the rod 168 to retract thus eliminating the catenaries 164. Roller 162 now turns faster than roller 158 and thus in cooperation with the retraction of piston rod 168 causes the catenary 164 to be reduced and all of the accumulated material to be fed into the annealing zone 114 as portion 3. Clearly, of course, the size of accumulator 34 and the speed at which rollers 158, 160 and 162 and piston rod 168 and piston 169 operate will be synchronized with the annealing unit such that a predetermined portion 3 will be fed into the annealing zone in each cycle.

The outlet accumulation zone 26 is illustrated schematically in FIG. 4. In the preferred embodiment illustrated the outlet accumulator is an inclined belt accumulator 28 capable of handling either relatively rigid "board" products or relatively flexible "blanket" products. A principal component of accumulator 28 is conveyor belt 176. Belt 175 runs around fixed rollers 178 and 179 and movable rollers 182 and 184, the latter being attached to piston 180 which operates in cylinder 186. The function of the outlet accumulation zone 26 is to accept the annealed portions 3 which are received seriatim as indicated at arrow 188 and discharge the body 2 continuously to conveyor 190 as indicated by arrow 192 so that a continuous feed to slitting, cutting or other subsequent handling operations will be maintained. This is necessary when a blanket product is being made. When a board product is being made, however, the normal use of knife 32 to cut the boards into specific lengths does not require continuous feed and therefore the outlet accumulator operates in a different manner.

The unit is supported by frame 198 which has the shape of an inverted U. Roller 182 is journaled at each end in the upright side members of frame 198 and is free to travel vertically in frame 198. Roller 182 is kept level by means of mechanical drive system 196 which acts through a shaft 195 and a sprocket 194 at each side of frame 198. (It will be evident that each of the side members of the U-shaped frame 198 contains equipment such as a sprocket 194 which is paired with an identical and cooperating component on the opposite side member. For simplicity herein the paired components will be referred to and illustrated in FIG. 4 as single devices since only one side of the symmetrical frame 198 is shown. The paired relationship will be understood by those skilled in the art, however.) The weights of roller 182, belt 176 and the conveyed blanket are counterbalanced by counterweight 202 which is connected to the end of roller 182 by cable 200. The end of roller 182 is also connected to cable 216 which is reeved over sprocket 194 and pulley 185, pulley 185 being connected to piston 218 which operates in cylinder 220.

When a "blanket" material is being produced, at the start of the transport phase of a cycle the outlet unit is disposed as follows: The belt is at 176', the movable rollers are at 182' and 184', the pulley is at 185' and the counterweight is at 202'. As the transport phase proceeds and material enters zone 26 as indicated by arrow 188, roller 182' proceeds upward to position 182 and roller 184' is drawn inward to position 184, extracting piston 180 from cylinder 186 and causing air to be forced through line 226 into tank 222. Roller 182 is moved upward by the combined action of drive unit 196 acting on cable 216 through sprocket 194 and by the pressure of air from tank 222 (or line 226) passing through line 224 to cylinder 220 and forcing piston 218 outward to drive the pulley out to position 185. At the end of the transport phase the operation reverses, and during the annealing phase, when no material is entering at 188, the roller 182 drops back to position 182', the other components reverse their movement described above, and material is fed smoothly and continuously from belt 176 onto belt 190 as indicated by arrow 192 as belt 176 returns to position 176'. Rollers 178 and 179 are powered to aid in moving belt 176 and discharging the accumulated material. Air lost from tank 222 is replenished as needed from line 228 (which is connected to a source of compressed air not shown). The sequence of operations repeats for every annealing cycle.

When a board product is being made the piston 180 is fully retracted to pull belt 176 taut across pulley 184" and the roller 182 is fully lowered to position 182" such that the belt 176 is horizontal as indicated at 176". The inflexible board products can then be moved across the belt 176 on conveyors 190 and 191 to be severed by knife 32. The severed portion moves away by conveyor means not shown for further handling while the remainder stays fixed in position until the beginning of the next transport phase. The apparatus remains in the same position and does not raise or lower during board production.

Although the inlet and outlet accumulation zones have been illustrated with the preferred form of accumulator in each, it will be understood that the two types of accumulators may be interchanged or that either or both may be replaced by other accumulation devices with equivalent functions.

FIG. 8 illustrates the operating mechanism that raises and lowers the upper platen 10U to open and close the annealing zone 14. The lower portion of unit 4 including plenum 6 and platen 10L is supported by frame 204 which is directly fixed to floor 206. The upper portion of unit 4 which includes plenum 8 and upper platen 10U is supported by fixed frame 208 which also rests on floor 206. Supported within frame 208 is movable frame 210 which directly supports plenum 8 and upper platen 10U. Movable frame 210 is connected to fixed frame 208 by piston-and-cylinder units 212, with one such unit 212 being mounted at each corner of the frame 210. Mounted centrally of frame 210 is piston-and-cylinder unit 214. As the final part of the transport phase of each cycle, the unit 214 is activated to bias the frame 210 downward, carrying with it platen 10U and plenum 8. The downward movement is continued until a spacing slightly greater than the proper spacing of platens 10 is obtained. At that point pistons 212 are activated to provide the final pressure to seal the edges of the portion 3 of body 2 to be annealed and to fix the platens 10 in their proper spaced apart relationship. Upon completion of the annealing phase the operations are reversed with units 212 being released followed by retraction of the unit 214 to open the annealing zone 14 and platens 10.

In the process of this invention the typical annealing phase time is from 5 to 200 seconds depending on the thickness of the portion 3 to be annealed and the temperature of the annealing air. For a fiber body of 1 inch (2.5 cm) nominal thickness and 6 lbs/cu. ft. (0.1 g/cm$^3$) nominal density, with annealing air at a temperature of about 1000° F. (540° C.), an annealing period of between 10 and 30 seconds has been found to be quite satisfactory. Control of the desired degree of annealing for a given density of blanket is preferably by means of control of the temperature and/or air flow rate of the hot annealing air, while the rate of blanket passage through the annealing zone remains constant. It is possible to use blanket passage rate as a control variable but that is not preferred because it makes the equipment and operations unduly complicated as compared to control by means of air temperature and/or flow rate.

Typical air pressure as measured immediately downstream from damper 74 will be up to approximately 6 inches of water and typical air pressure immediately downstream from damper 64 will be up to approximately 17 inches of water vacuum during the annealing cycle. Pressures may vary from these values with the end object, of course, being the most efficient flow of air through the portion 3. Unduly low air flow will extend the annealing phase time to an undesirable length. Those skilled in the art will be readily able to adjust the appropriate air pressures at given points in a particular system to provide for the optimum flow of air through a given thickness of material in a predetermined time. In the optional air transport phase of the operating cycle the pressure will typically be approximately 1 inch of water in line 86 downstream from damper 82. Any reasonable small amount of vacuum can be used in line 58 to draw hot air out of the hood.

FIGS. 9 and 10 illustrate schematically an alternative annealing zone structure 314. (Components corresponding to those in FIGS. 1 through 8 will be designated with like numerals preceded by a "3".) The annealing unit 304 is composed of two opposed and spaced apart continuous flexible metal belts 402 and 404 which are partially perforated, as described below. The belts travel respectively over rollers 406 and 408 which are powered as needed to drive the belts in the directions shown by arrows 410 and 412. The belts 402 and 404 are spaced apart the distance desired for the particular thickness of fiber body to be produced (taking into account the body's subsequent resilience, as noted above).

The belts 402 and 404 are each perforated from the centerline out to distance equal to the desired width of the fiber body by holes 414. The perforations do not extend into the outer portions 416 of the belts, which are of sufficient width to accomodate support blocks 418 and 422. The belts in the perforated area are perforated to the greatest degree consistent with efficient mechanical movement and adequate support of portion 303 of body 302. The belts are supported and maintained at the proper spacing by closely spaced idler rollers 430.

Resting on the inner surfaces of belts 402 and 404 are hollow air conduits 420 formed of longitudinal support blocks 418 and lateral support blocks 422. The support blocks are shaped and abutted to form a substantially air tight conduit for air passing from inlet plenum 306 through portion 303 and into outlet plenum 308 as indicated by arrows 316, 317 and 318. It may be found advantageous to use biasing means 424 (e.g., springs) urge the blocks against the belts to compensate for erosive wear of the blocks as the belts continually slide across their abutting surfaces. Carbon (as in the form of graphite) is the preferred material to make the support blocks from, since it will provide continuous lubrication of the sliding metal belts.

Movement of the blanket or body 302 is continual, such that an un-annealed portion 303' is always entering zone 314 (as indicated by arrow 426) while a portion 303 is being annealed in zone 314 and fully annealed material is exiting (as indicated by arrow 428).

Because of the various temperatures involved in the different parts of this system and particularly in the annealing unit, materials of construction must be chosen accordingly. Those skilled in the art will be aware of standard materials such as stainless steel grades for the high temperature components and appropriate thermal insulation where designated and can readily determine the appropriate materials to use for any particular installation.

It will also be immediately recognized that the system lends itself readily to automated control, particularly of temperature, pressure and cycle times. Use of microprocessors will also be desirable in conjunction with appropriate sensing devices for the parameters to be controlled.

STATEMENT OF INDUSTRIAL APPLICATION

The process and apparatus described herein are useful in the manufacture of inorganic refractory fiber bodies, which bodies find extensive industrial use as thermal insulation for ovens, kilns, furnaces and other devices which operate at elevated temperatures and in which it is desired to minimize heat loss and/or prevent heat flow effects to surrounding areas.

It is claimed:

1. A process for annealing of a body of refractory fiber which comprises passing air at a temperature in the range of from about 750° F. to about 1400° F. through said body for a period of from about 5 to about 200 seconds while maintaining said body with a predetermined dimension in the direction of air flow.

2. A process as in claim 1 wherein said temperature is in the range of from about 800° F. to about 1200° F.

3. A process as in claim 2 wherein said temperature is in the range of from about 900° F. to about 1100° F.

4. A process as in claims 1, 2 or 3 and further comprising, providing said fiber body in the form of a substantially continuous strip, passing segments of said fiber body seriatim into an annealing zone, retaining each segment in said annealing zone for said period while said air is passed therethrough to anneal said segment.

5. A process as in claim 4 and further comprising, moving said fiber body in the form of said continuous strip continuously into an inlet accumulation zone and passing segments of said strip intermittently and seriatim to said annealing zone.

6. A process as in claim 4 and further comprising, discharging said segments seriatim from said annealing zone and moving said segments intermittently into an outlet accumulation zone and discharging said segments continuously from said outlet accumulation zone.

7. A process as in claim 6 and further comprising, cooling each of said segments following said discharge from said annealing zone and prior to said receipt by said outlet accumulation zone.

8. A process as in claim 7 wherein said cooling is effected by passing ambient air through each of said segments.

9. A process as in claims 1, 2 or 3 and further comprising, maintaining the lateral or transverse dimensions of said body as well as the dimension in the direction of said air flow.

10. A process as in claim 4 wherein said strip comprises a plurality of layers of fibers.

11. A process as in claim 10 wherein the fibers in at least one of said layers differ in their temperature resistance properties from the fibers in at least one other of said layers.

12. A body of refractory fiber annealed according to a process as in claims 1, 2 or 3.

13. A body of refractory fiber annealed according to a process as in claim 4.

14. A laminated body of refractory fiber annealed according to the process of claim 10.

15. A laminated body of refractory fiber annealed according to the process of claim 11.

* * * * *